Feb. 10, 1942.   H. E. MARVEL   2,272,417
RESETTABLE REGISTER
Filed Feb. 28, 1938   2 Sheets-Sheet 1
Fig. 1
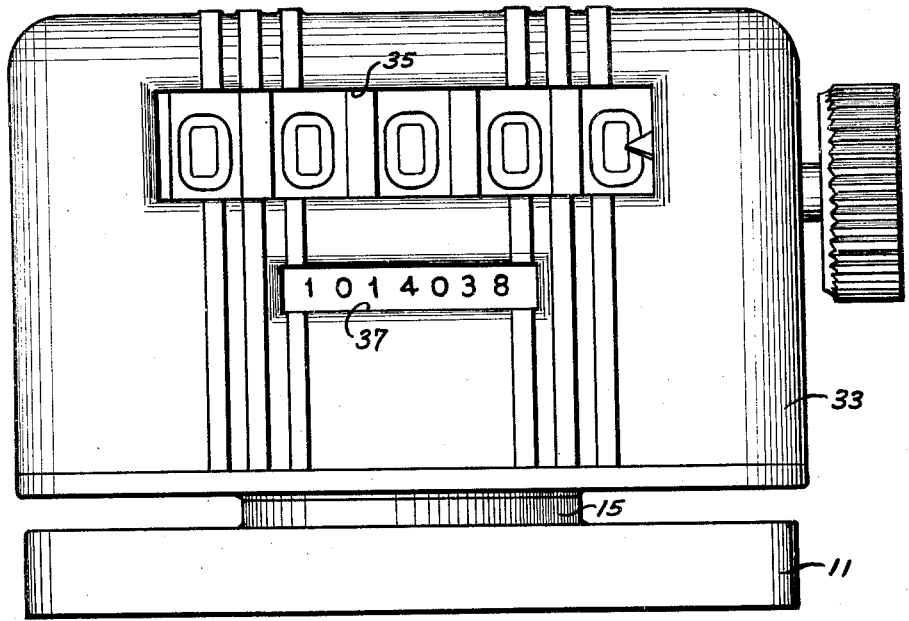
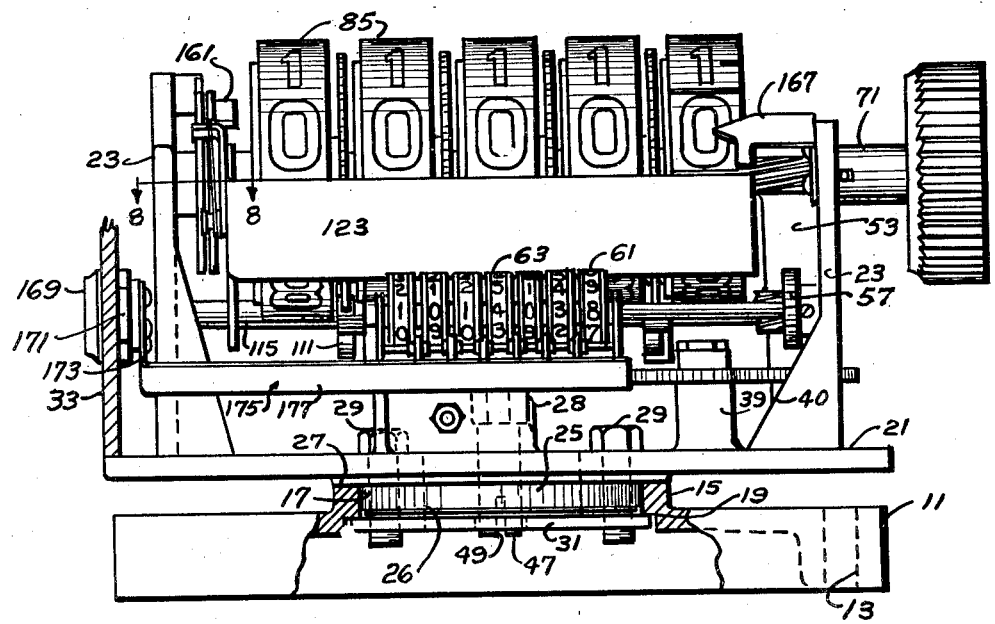
Fig 2
Harvey E. Marvel
INVENTOR.
BY Edmund W. E. Kamm
ATTORNEY.

Feb. 10, 1942.                H. E. MARVEL                2,272,417
                         RESETTABLE REGISTER
                         Filed Feb. 28, 1938            2 Sheets-Sheet 2
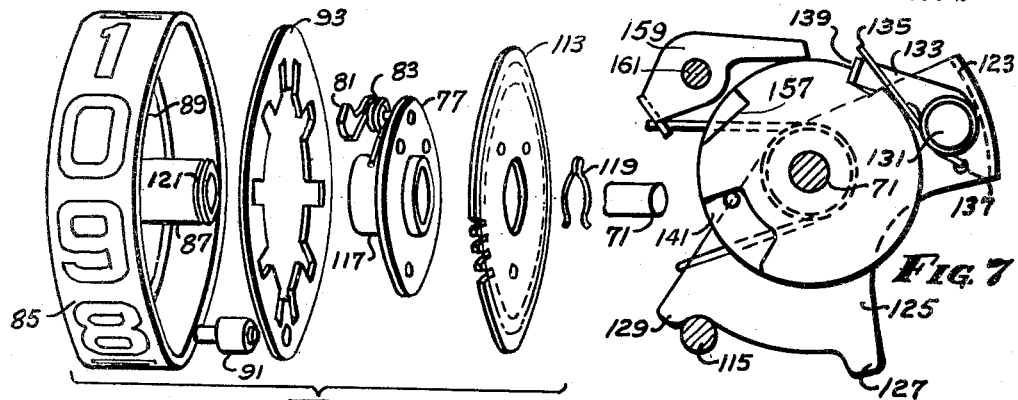
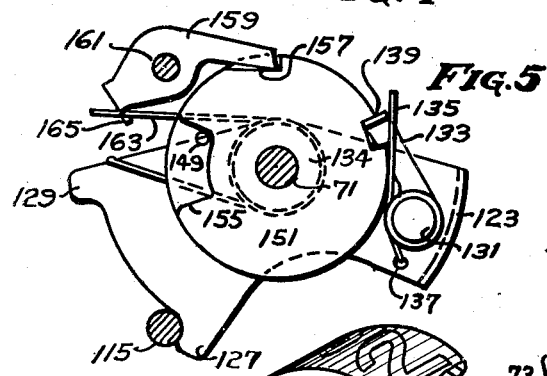
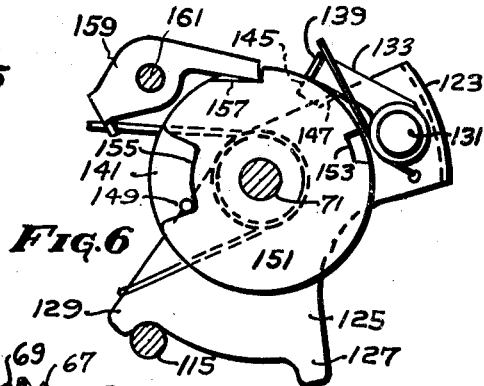
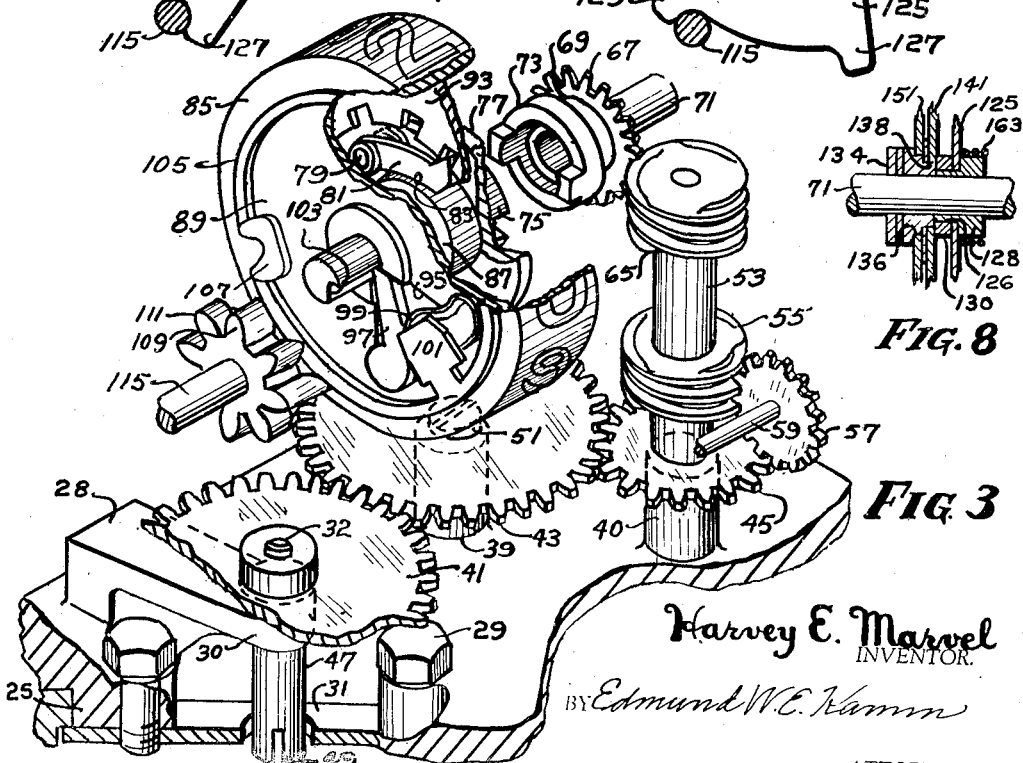
Harvey E. Marvel
INVENTOR.
By Edmund W. E. Kamm
ATTORNEY.

Patented Feb. 10, 1942

2,272,417

UNITED STATES PATENT OFFICE 2,272,417

RESETTABLE REGISTER

Harvey E. Marvel, Fort Wayne, Ind., assignor to S. F. Bowser & Company, Incorporated, Fort Wayne, Ind., a corporation of Indiana Application February 28, 1938, Serial No. 192,932

13 Claims. (Cl. 235—61)

This invention relates to resettable registers. More specifically, it relates to registers in which resettable indicating elements are adapted to be driven from zero indicating position and in which the elements are obscured while they are being reset to zero indicating position.

An object of the invention is to provide a resettable register in which the indicators are resettable in a forward or advancing direction and in which the initial movement of the resetting means is in a reverse direction.

Another object of the invention is to provide means for definitely limiting the resetting motion of the indicators and resetting means.

Yet another object of the invention is to provide a shutter for obscuring the indicators and means for moving the shutter to obscuring position during the reverse movement of the resetting means.

Still another object of the invention is to provide means for moving the shutter from obscuring position over the indicators when the indicators move into their zero indicating positions.

Another object of the invention is to provide indicator resetting means having a resetting cycle of slightly greater than one revolution said cycle comprising a preliminary retrograde motion.

Yet another object of the invention is to provide means for enforcing retrogression of the resetting means prior to motion thereof in a resetting direction.

Still a further object of the invention is to provide means for preventing operation of the indicator resetting means in a resetting direction until the predetermined motion of the resetting means in the reverse or retrograde direction has been effected.

A further object of the invention is to provide means for mounting a register on a fixed support which permits rotation of the register to any position about an axis which is substantially normal to the supporting means.

These and other objects will become apparent from the study of the following specification and the drawings which form a part thereof and in which Figure 1 is an elevation of the exterior of the register and its mounting means.

Figure 1 is an elevation of the register showing the arrangement of the windows and the general exterior appearance.

Figure 2 is an elevation of the register with parts broken away showing the indicators, shutter mechanism and the pivotal mounting.

Figure 3 of the perspective view with parts broken away showing the gearing and an assembled indicator dial which is driven by the gearing.

Figure 4 is an exploded view showing the various parts of an indicator dial and the relation between such parts.

Figure 5 is an end view, as seen from the left of Figure 2, of the shutter and reset stop mechanism in the position occupied when the indicator dials are at zero.

Figure 6 is a view similar to Figure 5 showing the position of the parts when the reset shaft occupies its farthest retrograde position.

Figure 7 is similar to Figures 5 and 6 showing the position of the parts with the shutter about to be displaced from indicator masking position.

Figure 8 is a sectional view taken on the line 8—8 of Figure 2 showing the means for mounting the shutter and cam disks.

Referring to Figure 2, the numeral 11 indicates a base member which is adapted to be fixedly attached by means of bolts entering holes 13 to a meter cap or the supporting member of some register driving mechanism. The base is provided centrally with a boss 15 which is provided with a central opening 17 and with an annular shoulder 19 which is formed by counter-boring the opening 17 from the bottom of the base 11.

A frame 21 is provided with end plates 23 which support the various parts of the register mechanism to be described. This frame is provided centrally with a downwardly directed boss 25 which is adapted to enter the opening 17 and which is provided with a shoulder 27 which is adapted to rest upon the upper surface of boss 15.

Openings extend through the boss 25 and cap screws 29 enter these openings and are threadedly engaged in tapped holes in a bar 31 which extends substantially diametrically of the boss 25 and is long enough to engage the shoulder 19 on each side of the opening 17. The boss 25 is of less length than the opening 17 and therefore by drawing down on the screws 29, the pressure of the bar 31 on shoulder 19 may be regulated. It will be seen that this construction permits a relative pivotal motion between the register frame 21 and the fixed base 11 when the cap screws are loose.

A cover 33 having windows 35 and 37 is attached to fit over the registering mechanism and enclose the same to protect it. The windows are sealed with glass in the usual manner.

The boss 25 is provided with a central opening 26 which passes through the frame 21 to provide clearance for a shaft 47 which is adapted to be driven by the shaft extending from a meter or other driving mechanism.

An arm 28 extends from the edge of the opening 26 toward the center thereof and carries a hub 30 which is adapted to receive a reduced portion 32 of the shaft 47. A gear 41 is fixed to the reduced portion 32 above hub 30. Since the gear and the shoulder on shaft 47 are disposed on opposite sides of the hub 30, the shaft and gear are prevented from moving in an axial direction.

A boss 39 extends upwardly from the frame member 21 and serves as a support for a gear 43 which meshes with gear 41. The shaft 47 is provided with an axial opening and a slot 49 at its lower end so that it can receive the end of an axially aligned shaft which carries a transverse pin in a manner well known in the art. The pin portion of this connection is not shown.

The gear 43 in turn meshes with a gear which is fixed to an upwardly directed shaft 53, the lower end of which is seated in an opening in a boss 40 formed on frame 21. Also fixed to the shaft 53 is a worm 55 which meshes with a worm wheel 57 mounted on a shaft 59 which is adapted to drive the lowest order wheel 61 of a cumulative register indicated generally by the numeral 63 (Figure 2). This register may be of any suitable construction and therefore it is not deemed necessary to describe it in detail.

The shaft 53 is provided at its upper end with a worm 65 which meshes with a worm wheel 67 which is mounted on a hub 69. This hub rotates freely on a resetting shaft 71 which is rotatably mounted in the end plates 23 of the frame.

The hub 69 also carries a clutch element 73 which is adapted to engage with a second clutch element 75 which is also mounted for free rotation upon the shaft 71 in abutting relation with the end of the hub 87 of an indicator dial 85.

The clutch element 75 is provided with a radially extending flange 77 to which is attached by means of a pin 79 a radially outwardly acting pawl 81.

The clutch element 75 extends beyond the flange 77 and serves as an abutment for one end of a coil spring 83, the other end of which abuts pawl 81 and forces it outwardly from the clutch element 75 for purpose to be described.

The indicator dial 85 which is formed with the hub 87 is mounted for free rotation upon the shaft 71. An integral radial flange 89 connects the dial portion of the indicator with the hub and a shouldered pin 91 is fixed in the flange 89 and supports an internal ratchet 93 in the same plane as the pawl 81.

The pawl 81 is so formed that it will transmit rotation from the clutch element 75 to the ratchet 93 and consequently to the dial 85 in a forward direction, that is in the direction of increasing numbers while at the same time it will permit rotation of the dials with respect to the clutch element in the same direction.

The flange 89 of the indicator dial is provided with a recess 95 in which is received a pawl 97 and a spring 99 which is adapted to urge the pawl toward the axis of the dial. A projection 101 extends inwardly over the recess 95 to hold the pawl and spring therein.

Pawl 97 is adapted to cooperate with a V-notch 103 in the shaft 71 and is so disposed with respect to said V-notch that rotation can be transmitted from the shaft to the pawl and hence to the indicator wheel in the forward direction, that is, in the direction of the increasing numbers; whereas, the indicator wheel may be rotated in the forward direction independently of the shaft, the pawl in that case being cammed out of the V-notch against the action of spring 99.

An annular rib 105 is formed near the outer periphery of the dial and is provided with two teeth 107 which are adapted to mesh with the teeth of a mutilated gear 109 in a well-known manner. The mutilated gear 109 is formed integrally with the gear 111 which is adapted to mesh with a gear 113 of the second indicator dial assembly.

The gear 109—111 is mounted for free rotation on a shaft 115 which is mounted at its ends in the end plates 23. The assemblies of the second and the remainder of the indicator wheels are substantially the same as that of the first wheel except that the pawl bearing flange 77 is provided with a hub 117 instead of with a clutch element 75, and has attached to it the gear 113. Thus, instead of being driven by a clutch connection such as that shown in Figure 3, the flange 77 and pawl 81 are driven by the gear 113 which is riveted to the flange.

The hub 117 with its flange 77 and gear 113 are held in operative relation with respect to the ratchet 93 and indicator wheel 85 by means of a spring clip 119 which engages a groove 121 in the outer end of hub 87 of the indicator wheel.

A shutter 123 is formed integrally with one arm of a lever 125 which is assembled on a reduced portion 126 of a hub 128 which is mounted for free rotation about the shaft 71. (See Figure 8.)

A collar 130 is assembled on said reduced portion 126 behind the lever 125 and the end of said reduced portion is upset or swedged so as to tightly bind lever 125 between the collar 130 and the shoulder on the hub 128. Thus, the hub 128, the lever 125 and the collar 130 will rotate as a unit upon shaft 71.

A collar 134 having two reduced portions 136 and 138 is pinned near the outer end of shaft 71. A cam disk 151 later to be described is loosely mounted on the reduced portion 136 and a spacer and a second cam disk 141 later to be described are mounted on the reduced portion 138 which is then upset or swedged so as to tightly confine the spacer and disk 141 against the shoulder formed between the portions 136 and 138. Thus, disk 141 will rotate with shaft 71 whereas disk 151 will be free to rotate with respect to disk 141 and the shaft.

Rotation of the lever 125 with hub 128 in a counterclockwise direction (Figure 5) will bring the shutter 123 into a position to cover the indicator dials 85 which would normally be visible through a window 35 of the cover. Rotation of the lever in the opposite direction will serve to uncover the indicator dials.

The lever 125 is provided with spaced, depending ears 127 and 129 which are adapted, when swung in an arc about shaft 71, to engage the shaft 115, thus limiting the extreme positions which the shutter 123 may occupy. These depending ears 127 and 129 are so spaced that when the ear 129 occupies a position adjacent the shaft 115 as shown in Figures 6 and 7, the shutter 123 will be positioned over the numerals on the indicator dials which are in alignment with the window 35 in the cover 33. When, however, the ear 127 lies adjacent to shaft 115 as shown in Figure 5, the shutter will be in its depressed position so that the numerals in alignment with the window 35 will be visible from the exterior of the casing 33.

The lever 125 carries, by means of a pivot pin 131, a pawl 133 which is urged in a counter-clockwise direction (Figures 5 to 7) by means of a spring 135 which encircles the pin 131 and has one end hooked through an opening 137 in the lever 125 and the other end resting upon a bent-over end portion 139 of the pawl.

The cam disk 141 which is fixed to rotate with the shaft 71 as described above by means of the hub 134 which is pinned to shaft 71, is provided with a cam notch 145 which has an abruptly rising inclined cam edge 147. A pin 149 is fixed in this disk for a purpose to be described.

The second cam disk 151 which is mounted for free rotation on the hub 134 as described above, is provided with a cam notch 153 which is identical in outline with the notch 145 of disk 141. The disk 151 has an elongated peripheral notch 155 which is adapted to align with a pin 149 which is fixedly set in disk 141. This structure forms a lost motion driving connection between the two disks.

A third notch 157 is formed in the periphery of the disk 151 and is adapted to be engaged by a pawl 159 which is pivoted on a pin 161 which is mounted in an end plate 23. A torsion spring 163 is looped about the enlarged portion of the hub 128 and one end of the spring is hooked over the edge of lever 125 adjacent projection 129 while the other end of said spring bears against a bent-over ear 165 on pawl 159 and serves to urge the pawl into engagement with the disk 151, while at the same time the spring urges the lever 125 to rotate in a counter-clockwise direction about shaft 71 (Figures 5, 6 and 7).

The notch 157 is formed so as to prevent counterclockwise rotation of the disk 151 as shown in Figure 5 so long as pawl 159 occupies the notch. The notch and pawl do not, however, prevent a clockwise rotation of the disk since the notch will cam the pawl out of engagement. The pin 149 and the notch 155 are so designed that when the upper edge of notch 155 engages the pin (Figure 5) the notches 145 and 153 in the cam disks will be in substantial alignment.

A pointer 167 is fixed to the right end plate 23 in alignment with window 35 and extends over the lowest order indicator dial.

A lock 169 having a rotatable element 171 which is adapted to be rotated by a key inserted in the lock has fixed thereto the short arm 173 of an L-shaped shutter indicated generally by the numeral 175.

The long arm 177 of the shutter is eccentric to the element 171 and is adapted to be positioned between the counter 63 and window 37 in case 33 when the key is turned to a position in which it may be withdrawn.

Operation

Assuming that the base member 11 is fixedly attached by means of screws or other fastenings to a driving device such as a meter, and that the shaft has been engaged with a pin connection on the driving device, if the screws 29 are loosened the frame 21 may be rotated about the vertical axis of a boss 25 until the counter proper assumes a position in which it can be easily read. The screws 29 will thereupon be drawn down tight and the counter will be clamped in the adjusted position.

If we assume that the indicator wheels occupy their zero indicating position and that the shutter 123 is in its lowermost position as shown in Figures 2 and 5, an operation of the meter or driving mechanism will cause rotation of shaft 47, gears 41, 43 and 45, shaft 53 and the worms 55 and 65.

The worm wheel 57 which is driven by worm 55 and which drives shaft 59, will rotate the lowest order wheel 61 of the cumulative counter 63 and the total result of various operations of the meter will be registered on this counter. The worm 65 will rotate worm wheel 67 and through clutch elements 73 and 75 which are in engagement, it will rotate flange 77 and pawl 81 of the first indicator dial 85 in an indicator advancing direction which, when viewed from the left hand end of Figure 3, is a clockwise direction. Pawl 83 will transmit motion through ratchet 93 to the first indicator dial 85 of the resettable register.

The rotation of this indicator dial will drive the gear 113 of the adjacent indicator dial by means of the gearing 107, 109 and 111 shown in Figure 3. In the second and higher order dial assemblies the gear 113 is fixed to the flange 77 which is mounted on hub 117 and the rotation received intermittently by gear 113 from the gear 111 will be transmitted to the ratchet 93 through the pawl 81. Since ratchet 93 is fixed to the next indicator dial 85 by a pin 91, rotation of the ratchet serves to advance this dial.

Adjacent indicator dial assemblies are of the same construction as the second indicator dial assembly which is shown in Figure 4 and they are operated in the same way.

When it is desired to reset the register, the operator cannot rotate the shaft 71 in a clockwise direction (Figure 3) because the bent-over end 139 of pawl 133 occupies both of the notches 145 and 153 on disks 141 and 151 and therefore prevents this rotation. Accordingly, it is necessary to operate the shaft 71 in a counter-clockwise direction, whereupon the notch 145 will move to the position shown in Figure 6 and the lower edge 147 of this notch will cam the pawl 133 out of engagement with notch 153, whereupon spring 163 will rotate lever 125 in a counter-clockwise direction until projection 129 contacts shaft 115 and shutter 123 will then occupy a position in front of the window 35. In other words the parts move from the positions of Figure 5 to those of Figure 6. This resetting mechanism is claimed in my application Serial No. 403,893, filed July 24, 1941, which is a division of this application.

The described motion of disk 141 does not induce motion in disk 151 because of the fact that pawl 159 occupies notch 157. Relative motion between the two disks is permitted by reason of lost motion connection comprising pin 149 and notch 155.

Since disk 141 is now free from pawl 133 the bent-over edge of which now rides on the circular outline of disk 141, clockwise motion of disk 141 is now permitted.

Upon rotating shaft 71 in the clockwise direction, the V-notch 103 will pick up the pawls 97 of the various indicator dials 85 and all of the indicator dials will be advanced until the zero indications thereon are in alignment.

During such rotation of the shaft 71, the pin 149 will contact the upper edge of slot 155 and two disks 141 and 151 will rotate together in a clockwise direction. The notches 145 and 153 of the disks will be in alignment because of the relation of pin 149 to the slot 155 and as the shaft rotates, the notches will arrive at the position shown in Figure 7 where spring 135 will force the bent-over end 139 of pawl 133 into the aligned notches, whereupon further rotation of shaft 71 and the disks will depress the shutter 123.

The rotation of the shaft 71 in this direction will be limited by the contact of projection 127 with shaft 115. At this point, the zero indications of the indicator dials 85 will have been aligned and positioned in front of the window 35. Also, when the parts reach this position, pawl 159 will engage notch 157 to hold disc 151 against rotation in a counter-clockwise direction (Figures 5 to 7).

It will be seen that further motion of the shaft 71 in this direction is definitely limited because the shaft is directly connected with disk 141 and motion of a disk 141 in clockwise direction is definitely limited through pawl 133 and lever 125 of the shutter which carries the projection 127.

It will be seen that by reason of counter-clockwise rotation of the shaft 71 at the outset of the resetting operation, the V-notch 103 has been rotated through more than one revolution by the amount of the initial counter-clockwise motion, thus insuring that all of the pawls 97 will be picked up in the resetting operation. This has the advantage that two complete revolutions of shaft 71 are avoided.

It will further be seen that the operator would gain nothing by attempting to rotate the indicator wheels in a reverse direction because even a slight counter-clockwise rotation of shaft 71 results in a release of pawl 133 and in the covering up of the window 35 by the shutter 123.

During the resetting of the indicator wheels, the gear 67 and clutch 73—75 remain stationary because of the fact that the worm gearing described is irreversible. Accordingly, rotation of the indicator wheels 85 with respect to the driving train is permitted by the relative movement between ratchets 93 and the pawls 81 which yield against the action of their spring 83 during the resetting operation.

Shutter 117 prevents unauthorized persons from inspecting the cumulative counter 63. An authorized person may inspect this counter by simply inserting the proper key in lock 169 and by turning the key, depress the shutter. However, before the key can be withdrawn from the lock, it is necessary to return the shutter to its original position in which it is retained by the lock after the key is withdrawn.

It is obvious that various changes may be made in the form, construction and arrangement of parts and for this reason, applicant does not desire to be limited to the specific embodiment shown and described but instead desires protection coming fairly within the scope of the appended claims.

What I claim to be new and desire to protect by Letter Patents is:

1. In a resettable register comprising a series of indicators having a zero position, means for driving the indicators from zero, the combination of means for resetting the indicators to zero independently of said driving means, comprising a rotatable shaft, means for connecting each of said indicators for resetting rotation by said shaft, a shutter movable between predetermined indicator obscuring and revealing positions, means normally urging said shutter toward obscuring position, latching means on said shutter, cooperating latching means on said shaft including an element fixed on said shaft and an element having a lost motion connection therewith and mounted freely on said shaft and means on said fixed element for disengaging the latching means upon anti-resetting rotation of said shaft, whereby said shutter will be moved to obscuring position and said shaft will be freed for resetting rotation, and means cooperating with said free element for limiting the anti-clockwise rotation of said shaft through the intermediary of said lost motion connection.

2. In a resettable register comprising a series of indicators having a zero position, means for driving the indicators from zero, the combination of means for resetting the indicators to zero independently of said driving means, comprising a rotatable shaft, means for connecting each of said indicators for resetting rotation by said shaft, a notched disk fixed to the shaft and a notched disk mounted for free rotation on the shaft, lost motion connection means between said disks, said notches being disposed so as to be in alignment when the lost motion is taken up in the resetting direction, a shutter adapted to be moved between obscuring and non-obscuring positions, yieldable means for holding said shutter in obscuring position, stops for definitely establishing said shutter positions, a latch on said shutter adapted to engage said notches when they are in alignment, said latch and notches being proportioned and arranged to effect such engagement in time to move said shutter to non-obscuring position substantially at the end of the resetting operation and means effective in the final position of said disks for preventing anti-resetting motion of said free disk.

3. In a resettable register comprising a series of indicators having a zero position, means for driving the indicators from zero, the combination of means for resetting the indicators to zero independently of said driving means, comprising a rotatable shaft, means for connecting each of said indicators for resetting rotation by said shaft, stops means, a shutter movable between indicator obscuring and revealing positions predetermined by said stop means, means normally urging said shutter toward obscuring position, latching means on said shutter, cooperating latching means on said shaft including an element fixed on said shaft and an element mounted freely on said shaft and having a lost motion connection with said first-mentioned element, means on said fixed element for disengaging the latching means upon anti-resetting rotation of said shaft, whereby said shutter will be moved to obscuring position by said urging means and said shaft will be freed for resetting rotation.

4. In a resettable register, comprising a series of indicators having a zero position, means for driving the indicators from zero, the combination of means for resetting the indicators to zero independently of said driving means, comprising a rotatable shaft, means for connecting each of said indicators for resetting rotation by said shaft, a notched disk fixed to the shaft and a notched disk mounted for free rotation on the shaft, lost motion connection means between the free disk and the fixed disk, said notches being disposed so as to be in alignment when the lost motion is taken up in the resetting direction, a shutter adapted to be moved between obscuring and non-obscuring positions, stops for definitely establishing said shutter positions, means for moving said shutter toward obscuring position, a latch on said shutter adapted to engage said notches when they are in alignment, said notches and latch being disposed and proportioned to effect such engagement before the indicators reach the zero position and to move said shutter to non-obscuring position to terminate the resetting operation.

5. In a resettable register comprising a series of indicators having a zero position, means for driving the indicators from zero, the combination of means for resetting the indicators to zero independently of said driving means, comprising a rotatable shaft, means for connecting each of said indicators for resetting rotation by said shaft, a notched disk fixed to the shaft and a notched disk mounted for free rotation on the shaft, lost motion connection means between the free disk and the fixed disk, said notches being disposed so as to be in alignment when the lost motion is taken up in the resetting direction, a shutter adapted to be moved between obscuring and non-obscuring positions, stops for definitely establishing said shutter positions, yieldable means normally urging said shutter toward obscuring position, a latch on said shutter adapted to engage said notches when they are in alignment, said latch and notches being disposed and proportioned to effect such engagement in time to move said shutter to non-obscuring position to terminate the resetting operation, the notch of said fixed disk being formed with an abruptly rising cam portion for ejecting said latch.

6. In a resettable register comprising a series of indicators having a zero position, means for driving said indicators from zero position, the combination of means for resetting said indicators to zero position comprising a rotatable resetting element, means for preventing effective movement of said element in a resetting direction, means operable by said element upon rotation of said element in an anti-resetting direction for rendering said preventing means ineffective, means for obscuring said indicators, means for moving said obscuring means to obscuring position rendered operable when said preventing means is rendered ineffective during the course of the anti-resetting rotation of said element.

7. In a resettable register comprising a series of indicators having a zero position and means for driving said indicators from zero position, the combination of means including a shaft for resetting said indicators to zero position, a shutter, means mounting said shutter for movement between obscuring and non-obscuring positions with respect to the zero position of said indicators, a latch plate, means for connecting said latch plate with said resetting shaft for movement thereby, means adapted to engage said latch plate for transmitting movement to said shutter in one direction and to retain it in one position, and means for preventing movement of said latch plate to disengage said transmitting means.

8. In a resettable register comprising a series of indicators having a zero position and means for driving said indicators from zero position, the combination of means including a movable shaft for resetting said indicators to zero position, a shutter, means mounting said shutter for movement between obscuring and non-obscuring positions with respect to the zero position of said indicators, means for moving said shutter toward its obscuring position, a latch plate, means connecting said latch plate with said resetting shaft for movement thereby, means adapted to engage said latch plate for transmitting movement to said shutter in one direction toward its non-obscuring position and to retain it in said position, means for preventing movement of said latch plate to disengage said transmitting means, and means operable at will to release said shutter for movement to its obscuring position.

9. In a resettable register comprising a plurality of indicators having a zero position and means for driving said indicators from said zero position, the combination of resetting means comprising a reset shaft, a disk fixed to said shaft and provided with a notch, a second disk rotatably mounted on said shaft and provided with a notch, a lost motion connection between said disks adapted to align the notches of said disks and to thereupon transmit motion from said first to second mentioned disk in a resetting direction, a lever pivoted on said shaft and comprising two arms, a latch pawl mounted on one arm for cooperation with said notches, stop means mounted on the other arm, a fixed stop mounted for cooperation with said stop means, yieldable means for urging said lever in one direction, said disks, notches and latch pawl being constructed and arranged to transmit movement of said disks to said lever to move it in its other direction.

10. In a resettable register comprising a series of indicators having a zero position, means for driving said indicators from zero position, the combination of means, including a resetting shaft, for resetting said indicators to zero position, a shutter mounted for movement between operative and inoperative positions for obscuring or revealing said indicators, means adapted to hold said shutter in inoperative position, means actuated by the resetting shaft when it is operated in an anti-resetting direction, for rendering said shutter holding means ineffective, and means for moving said shutter to operative position upon release of said holding means.

11. In a resettable register comprising a series of indicators having a zero position, means for driving said indicators from zero position, the combination of means, including a resetting shaft, for resetting said indicators to zero position, a shutter mounted for movement between operative and inoperative positions for obscuring or revealing said indicators, means adapted to hold said shutter in inoperative position, and means actuated by the resetting shaft when it is operated in an anti-resetting direction, for rendering said shutter holding means ineffective.

12. In a resettable register comprising a series of resettable indicators having a zero position, means for driving said indicators from said zero position, a rotatable indicator resetting shaft and means for connecting each of said indicators to be driven by said shaft toward said zero position, the combination with stop means, an element mounted for movement between two positions defined by said stop means, means including a latch and a latch receiver for connecting said element for movement to the first of its stop positions by said resetting shaft upon rotation thereof in a resetting direction, additional means connected for operation by said shaft in an anti-resetting direction for disengaging said latch and said latch receiver, means for moving said element to the second of its positions when said latch and latch receiver are disengaged, a shutter connected to be moved by said element and adapted to be disposed at the zero position of said indicators when said element occupies its second position.

13. In a resettable register comprising a series of indicators having a zero position, the combination of means for resetting said indicators to zero position comprising a rotatable reset shaft, stop means, an element movable between two positions defined by said stop means, means including a releasable device for connecting said shaft to move said element toward the first one of its stop positions upon resetting rotation of the shaft, said connecting means, said element and said stop means being constructed and arranged for stopping said shaft with indicators in the zero position when said element reaches said first position, means operable by said shaft as it moves in anti-resetting direction, for releasing said device to free said element for movement to its second stop position, means for moving said element to said second position and a shutter connected to be moved by said element between obscuring and non-obscuring positions with respect to the zero position of said indicators as said element moves from one of its stop positions to the other.

HARVEY E. MARVEL.